United States Patent [19]

Lamanna et al.

[11] Patent Number: 5,708,255
[45] Date of Patent: Jan. 13, 1998

[54] PREPARED MEAL SYSTEM WITH LOWER HOTPLATE HAVING A PLURALITY OF HEATING ZONES AND AN UPPER RADIANT HEATING ELEMENT AND OPERATED IN ACCORDANCE WITH PRE-PROGRAMMED COOKING PROGRAMS SELECTED BY A USER

[76] Inventors: Dominic Lamanna, 50 Goegan Street, Werribee, Victoria, 3030; Ronald Joseph Menz, 91-95 Goldsworthy Road, Corio, Victoria, 3214, both of Australia

[21] Appl. No.: 608,093

[22] Filed: Feb. 28, 1996

[30] Foreign Application Priority Data

Nov. 28, 1995 [AU] Australia ............... PN6843/95

[51] Int. Cl.⁶ .................. F27D 11/00; A47J 27/62
[52] U.S. Cl. .................. 219/396; 219/385; 219/386; 219/397; 219/398; 219/411; 219/446; 219/480; 219/525; 219/524; 99/339; 99/331
[58] Field of Search ............... 219/385–386, 219/396–398, 403, 411, 446, 480, 524–525, 521; 34/202; 392/416, 418; 99/331, 339, 467–468

[56] References Cited

U.S. PATENT DOCUMENTS

| | | | |
|---|---|---|---|
| 3,155,814 | 11/1964 | Appleman et al. | 219/411 |
| 3,974,358 | 8/1976 | Goltsos | 219/521 |
| 4,041,277 | 8/1977 | Shumrak et al. | 219/386 |
| 4,164,643 | 8/1979 | Peart et al. | 219/411 |
| 4,178,500 | 12/1979 | Brindopke | 219/524 |
| 4,215,266 | 7/1980 | Smith et al. | 219/413 |
| 4,238,669 | 12/1980 | Huntley | 219/405 |
| 4,375,586 | 3/1983 | Ueda . | |
| 4,822,981 | 4/1989 | Chaudoir | 219/385 |
| 4,831,226 | 5/1989 | Robeson et al. . | |
| 4,876,437 | 10/1989 | Kondo | 219/388 |
| 5,039,535 | 8/1991 | Lang et al. . | |
| 5,317,130 | 5/1994 | Burkett et al. | 219/497 |
| 5,345,067 | 9/1994 | Ohta et al. . | |

FOREIGN PATENT DOCUMENTS

| | | |
|---|---|---|
| 082311 | 6/1983 | European Pat. Off. . |
| 463657 | 1/1992 | European Pat. Off. . |
| 1328755 | 9/1973 | United Kingdom . |
| 1417199 | 12/1975 | United Kingdom . |
| 2263764 | 8/1993 | United Kingdom . |

*Primary Examiner*—Teresa J. Walberg
*Assistant Examiner*—Raphael Valencia
*Attorney, Agent, or Firm*—Knobbe, Martens, Olson & Bear, LLP

[57] ABSTRACT

A prepared meals system has at least one food container and cooking unit. The food container has at least two compartments for different foods to be heated at different temperatures and/or times. The cooking unit has at least one cooking station having two or more heating zones on a lower surface and at least one grilling element above the heating zones. The user selects one of several preprogrammed cooking procedures according to the indicia on a selected container having the desired food. A heat controller operates to control the times and temperatures of the heating zones and grilling element to appropriately cook the food in the container.

6 Claims, 9 Drawing Sheets

PREPARED MEAL SYSTEM WITH LOWER HOTPLATE HAVING A PLURALITY OF HEATING ZONES AND AN UPPER RADIANT HEATING ELEMENT AND OPERATED IN ACCORDANCE WITH PRE-PROGRAMMED COOKING PROGRAMS SELECTED BY A USER

BACKGROUND OF THE INVENTION

1. Field of the Invention

The present invention relates to a prepared meals system and more particularly to a cooking unit for use in such a system.

2. Description of the Prior Art

While delivered meals systems such as "meals on wheels" have been in use for many years, in practice it has proven very difficult to provide a nutritious, well balanced and palatable meal to recipients who are unable to prepare meals for themselves. In the so-called "cook/chill" system a pre-prepared meal is cooked by the supplier, is chilled, and supplied to the recipient in a chilled state for reheating immediately prior to consumption. Although this system can be reasonably effective and is an improvement on systems where the meal is cooked at a central depot and is maintained in a warmed state during supply to the consumer, re-heated chilled foods do not always have the desired degree of palatability. Certain foods are, inherently, not very palatable when re-heated.

The present invention seeks to provide a prepared meals system comprising packaged meals consisting basically of uncooked ingredients, and a cooking unit specifically designed for cooking the packaged meals according to predetermined cooking programs.

SUMMARY OF THE INVENTION

According to one aspect of the invention, there is provided a cooker unit comprising at least one lower heating element for heating a food container from the underside, at least one radiant heating element at a position above the lower element to radiantly heat from above food within the container, control means for operating the heating elements, the control means operating in accordance with a selected one of a plurality of predetermined programs, and program selector means operable by the user to select the required program, the programs being non-variable by the user.

In a preferred embodiment of the invention, the lower heating element is operable to heat a hotplate on which the food container stands and the upper radiant element forms a grilling element. Preferably there are two lower heating elements operable to heat, differentially, separate compartments of the food container in accordance with the selected program.

Advantageously, control of the unit by the user can only be effected by means of each selected one of the predetermined programs.

A prepared meals system in accordance with the invention comprises a cooking unit as defined above in which the program selector means operable by the user has discrete indicia for each respective program, and a series of food containers for use on the cooking unit, each said container preferably being of metal foil and containing food to be cooked in accordance with a selected one of the programs, each container having indicia corresponding to that of the required program of the program selector means.

According to another aspect of the invention, there is provided a cooker unit comprising a plurality of cooking stations, each cooking station comprising at least one lower heating element for heating a food container from the underside, and at least one radiant heating element at a position above the lower element to radiantly heat from above food within the container, control means for operating the heating elements, said control means operating in accordance with a selected one of a plurality of predetermined programs, and program selector means operable by the user to select the required program, the control means being such that each cooking station can be separately controlled in accordance with a selected one of the predetermined programs.

BRIEF DESCRIPTION OF THE DRAWINGS

Embodiments of the invention will now be described, by way of example, with reference to the accompanying drawings in which.

DESCRIPTION OF THE PREFERRED EMBODIMENTS

Figure 1:
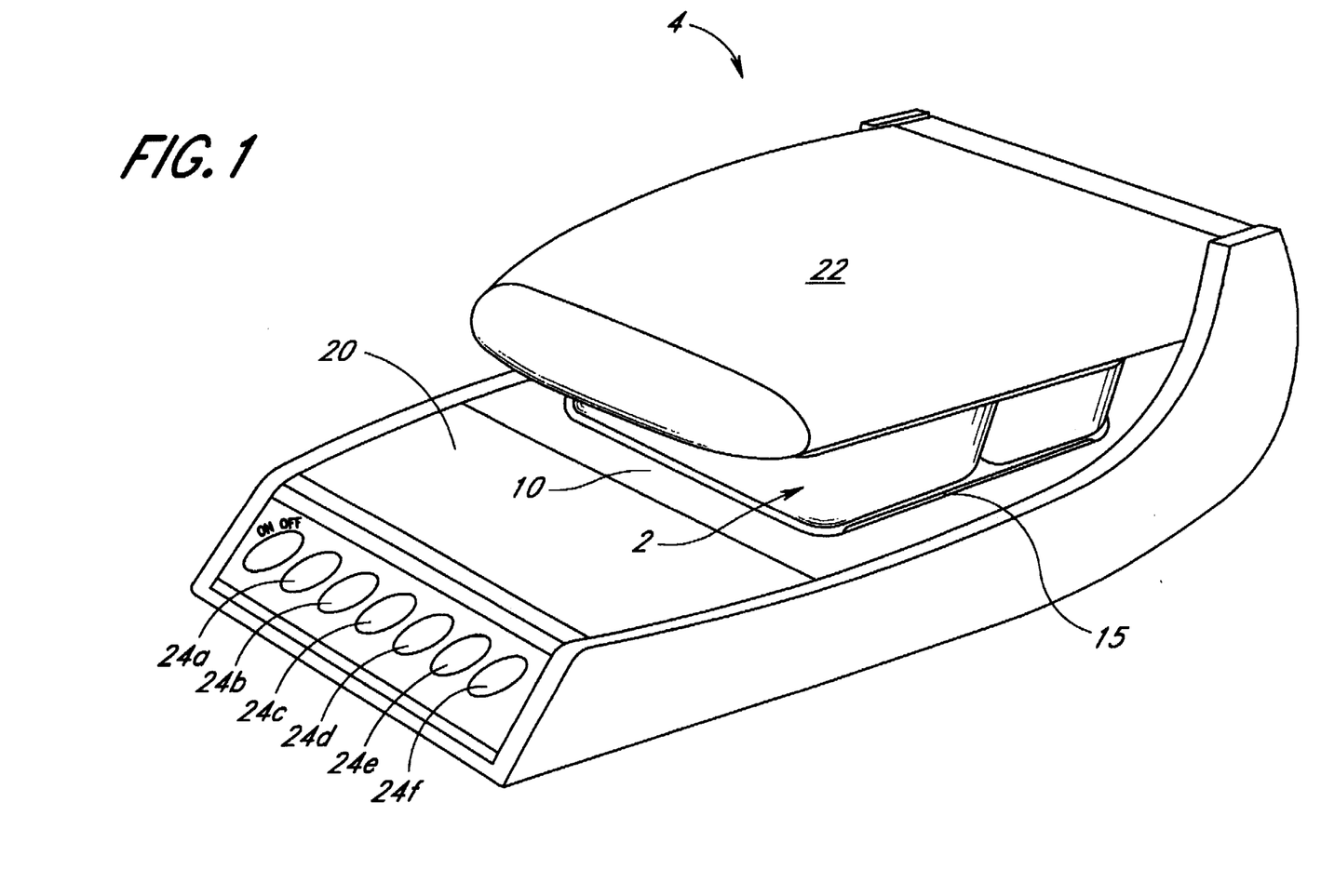
FIG. 1 is a perspective view of a cooking unit in accordance with a first embodiment of the invention, with a cover of the cooking unit being shown in a lowered condition.
Figure 2:
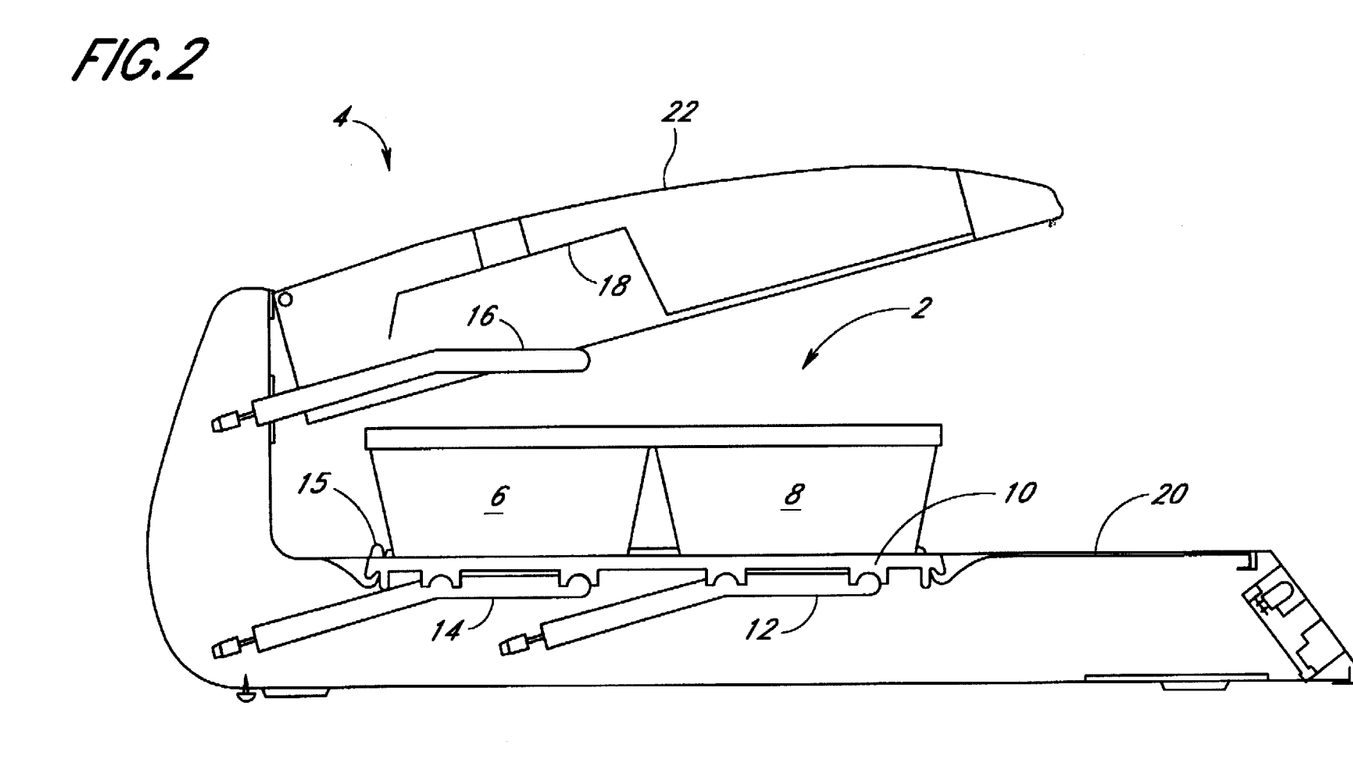
FIG. 2 is a schematic side view, in section, of the cooking unit, with the cover being shown in a raised condition.

The meals system in accordance with the first embodiment of the invention comprises pre-prepared meals each consisting primarily of uncooked ingredients packaged within a container 2, and a cooking unit 4 pre-programmed for use with the meal packages. The meal packages will normally be supplied in a frozen or chilled state for subsequent cooking using the pre-programmed cooking unit. Each container 2 comprises a dish of metal foil having a removable lid, the dish being divided into two compartments 6, 8 of which the rearmost compartment 6 will usually contain meat or fish, and the front compartment 8 may contain vegetables, rice, noodles or pasta. However, certain meals may require only a single compartment and in that case the foil dish may be of a size equivalent to only one of the two compartments or of a size equivalent to that of the overall divided dish.

The cooking unit 4 comprises a hotplate 10 having front and rear heating zones heated by separate front and rear electric heating elements 12, 14. The hotplate 10 has a length approximately equivalent to that of the container 2, with the heating zones being so positioned that they are directly beneath the respective compartments 6, 8 of the container 2. The width of the hotplate 10 is approximately equivalent to the width of the container 2, and to facilitate proper location of the container 2 on the hotplate 10 the hotplate may be formed with an upstanding rib 15 along each longitudinal side and across its rear edge. Although it is preferred to use, for reasons of cost, a single hotplate 10 with separate front and rear heating zones, it will be appreciated that the same effect could be achieved by separate front and rear hotplates arranged at the same level so that the container can be slid across both hotplates. A radiant grilling electric element 16 is mounted above the rear heating zone so as to overlie the rear compartment 6 of the container 2. The radiant grilling element 16 is associated with a reflector 18 to reflect radiant heat downwardly into the rear compartment 6. The radiant grilling element 16 in conjunction with the rear heating zone of the hotplate 10 is of particular importance in cooking certain meat or fish products in the rear compartment 6 as satisfactory cooking of some uncooked products cannot always be obtained by the use of a hotplate alone.

The cooking unit 4 is of a such size that it is portable and can be stood on a work bench, the hotplate 10 being mounted on a base part 20 of the unit, and the grill element 16 being mounted so as to lie beneath a hinged cover 22 pivotal between a lowered position (as shown in FIG. 1) in which its underside is in close proximity to the upper side of the container 2 and a raised position (as shown in FIG. 2) to facilitate placement and removal of the container 2 into and from the cooking unit. The reflector 18 for the grill element 16 is carried by the cover 22, and when the cover 22 is in its lowered position the grill element 16 is enclosed from above and at the sides by the reflector 18. The unit may include a safety switch responsive to the position of the cover 22 to permit actuation of the unit only when the cover is in its lowered position. Alternatively, the cover 22 may be permanently fixed in its lowered position without provision for raising. In another alternative arrangement, the reflector 18 may be fixed in position relative to the grill element, rather than being carried by the hinged cover 22.

Unlike in conventional cookers, the electrical elements 12, 14, 16 are not individually operable and controllable by the user but are instead operated in accordance with a pre-programmed control system. As will be apparent different meals within the containers 2 may require different combinations of cooking times and cooking temperatures, and the product in the rear compartment 6, say a meat or a fish product, will usually require a longer cooking time at a higher temperature than, say, vegetables in the front compartment 8. The control system is pre-programmed to provide a number, for example six different cooking programs which provide different combinations of start/finish times, temperatures, and actuation of the two hotplate elements 12, 14 and the radiant grilling element 16. For example, one program may result in a certain sequence of operation of the rear hotplate element 14 and the radiant grilling element 16 in order to roast a meat product in the rear compartment 6, with the front hotplate element 12 being inactive until significant roasting has already taken place so that, for example vegetables or noodles in the front compartment 8 and which only need a shorter cooking time, are ready at the same time as the meat product. Another program appropriate for casseroling a meat product in the rear compartment 6 might not actuate the radiant grilling element 16, the two hotplate elements 12, 14 being differentially actuated in accordance with the program in order to cook the casserole in the rear compartment 6 and the vegetables or other product in the front compartment 8. Other meat or fish dishes may just require cooking by grilling without the need to activate the rear hotplate element 14, only the front hotplate element 12 being activated at a predetermined time relative to the commencement of grilling in order to cook vegetables or other product in the front compartment 8. Each of the predetermined programs is actuated by a program selector on the body of the unit. It has been determined that a selection of about six different programs will be adequate for use with a wide range of different meals. However, it will be clear that there may be more than or less than six programs, although for simplicity of operation by elderly or disabled people it is not desirable for there to be significantly more than six programs.

Preferably, the program selector takes the form of separate touch pads or buttons 24a, 24b, 24c, 24d, 24e, 24f, one for each program. Each touch pad or button is colour coded and/or numbered and each meal package carries corresponding indicia appropriate to the program required to cook that meal. All that is then necessary is for the user to place the container 2 on the hotplate 10, the ribs at the sides and end of the hotplate 10 ensuring proper location, the user then starting the cooking process by touching the pad or button which carries the same coding as that on the meal package. The package itself will be clearly marked, for example with an arrow or other indicia, to show the direction of insertion onto the hotplate 10 in order to ensure that the designated rear compartment 6 is at the rear of the hotplate 10. Cooking will then automatically take place in accordance with the predetermined program and no other action is necessary on the part of the user, until the program has been completed which is indicated by an audible and/or visual alarm signal. The actions required on the part of the user are extremely straightforward and would be well within the capabilities of persons with a degree of intellectual impairment, for example as a result of senile dementia. The meal packages may be delivered in batches to the user for storage in a freezer or refrigerator, thus considerably reducing delivery costs. However, when cooked, the meal will have the taste of a freshly prepared meal rather than a re-heated meal as occurs with the "cook/chill" system discussed at the outset.

Figure 3:
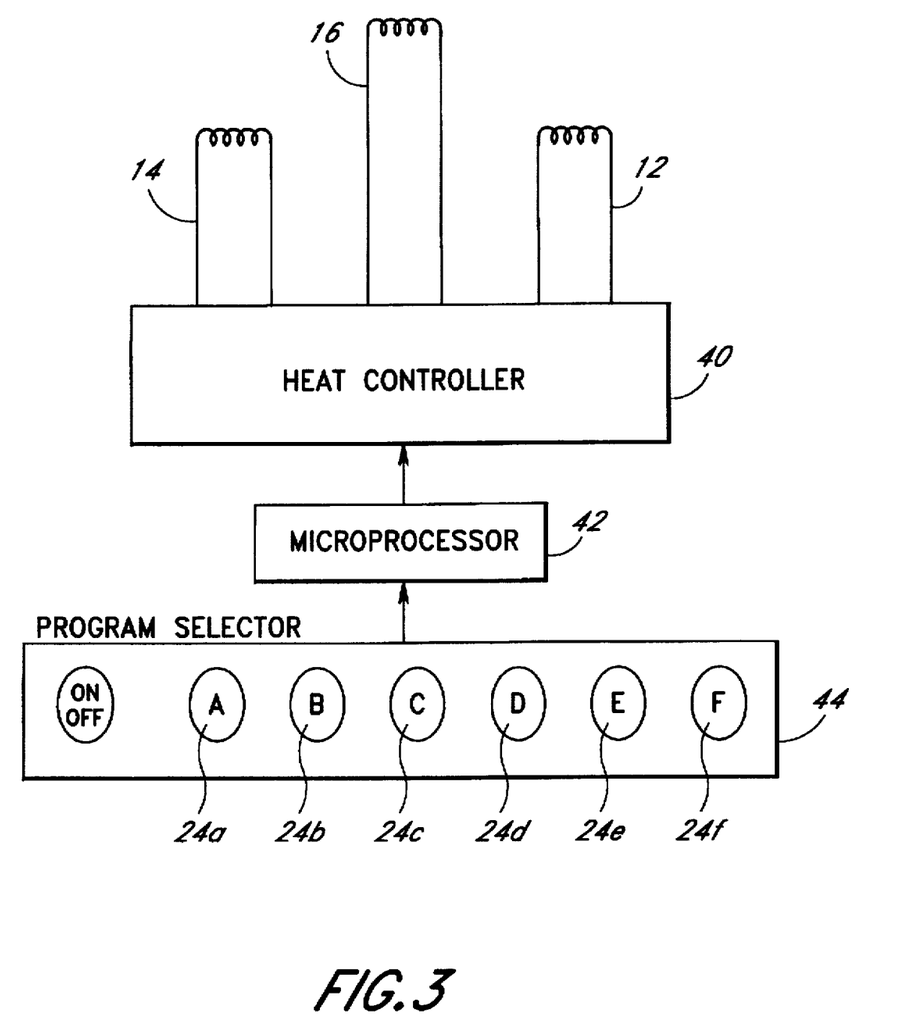
FIG. 3 shows schematically a control circuit of the unit.

The control circuitry for the two hotplate elements 12, 14 and radiant grilling element 16 will be in accordance with conventional circuit design principles and will be immediately apparent to those skilled in the art. Using standard techniques, the individual programs themselves can be incorporated into a microprocessor chip. FIG. 3 illustrates, in schematic form, suitable control circuit. In that Figure, a control device 40 for controlling the actuation of, and the temperature of, the three elements 12, 14, 16 and is itself controlled by a microprocessor chip 42 pre-programmed with the six operating programs, the required program being selected by touch pads or buttons 24a, 24b, 24c, 24d, 24e, 24f of a program selector 44.

Although many domestic cookers currently in use incorporate a program control facility, normally this is associated only with the oven part of the cooker and the program control is usually subject to variable input by the user and is supplementary to a direct manual control function. In the cooking unit of the preferred embodiment of the invention, the user is only able to operate the unit in accordance with a selected one of a number of predetermined control programs. There is no provision for direct, non-programmed, actuation by the user and the user has no means of varying the programs although it is envisaged that in some cases it may be desirable for a program variation facility to be incorporated within the interior of the unit to permit variation in individual programs by authorised service personnel only, but this facility will not be accessible by the user of the unit. Indeed, as significant use of this unit is likely to be by elderly people, it is important that the user is unable to operate the unit except in accordance with a selected one of the predetermined control programs.

Figure 4:
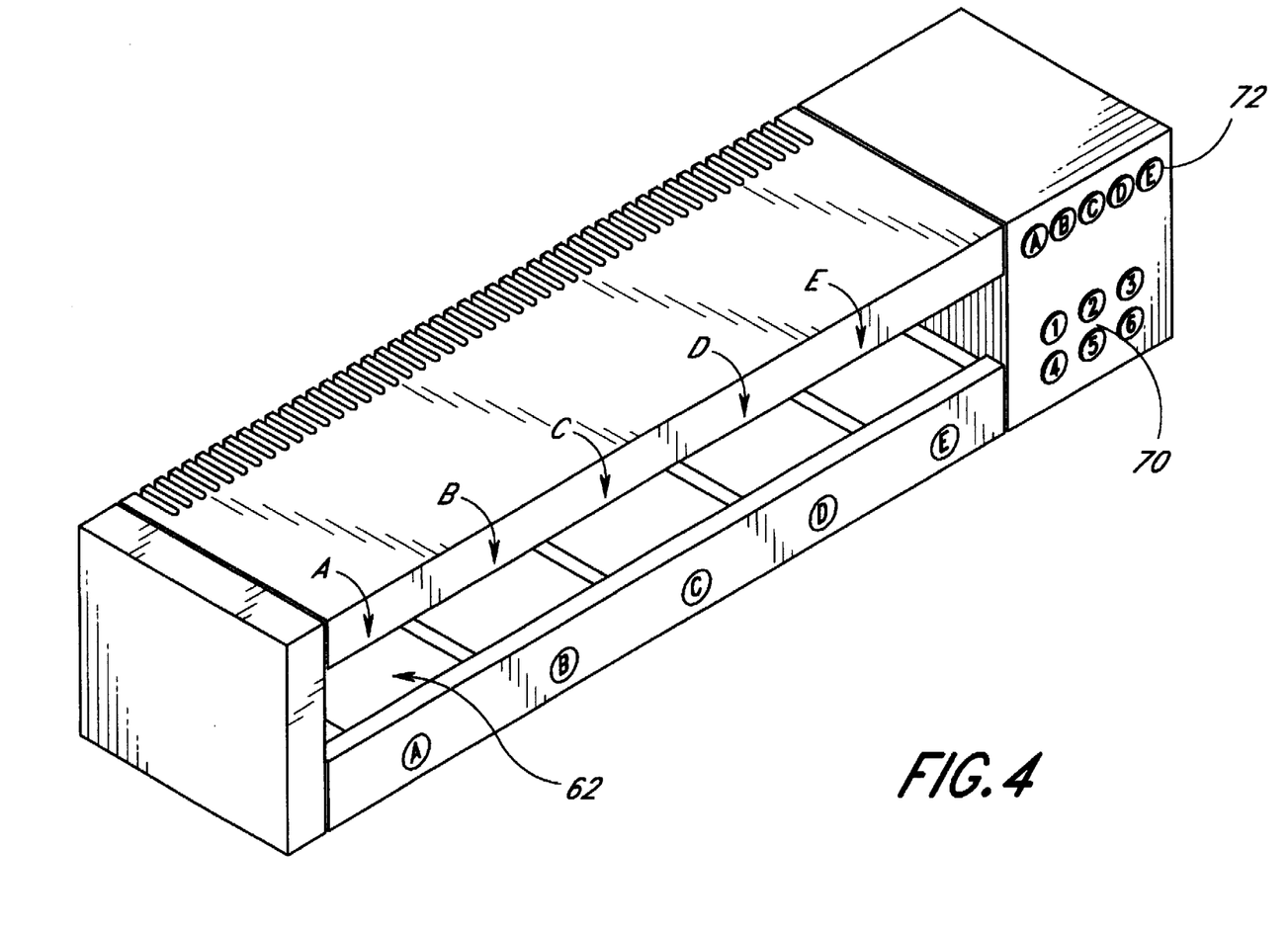
FIG. 4 is a perspective view of a second embodiment of a cooker unit in accordance with the invention.
Figure 5:
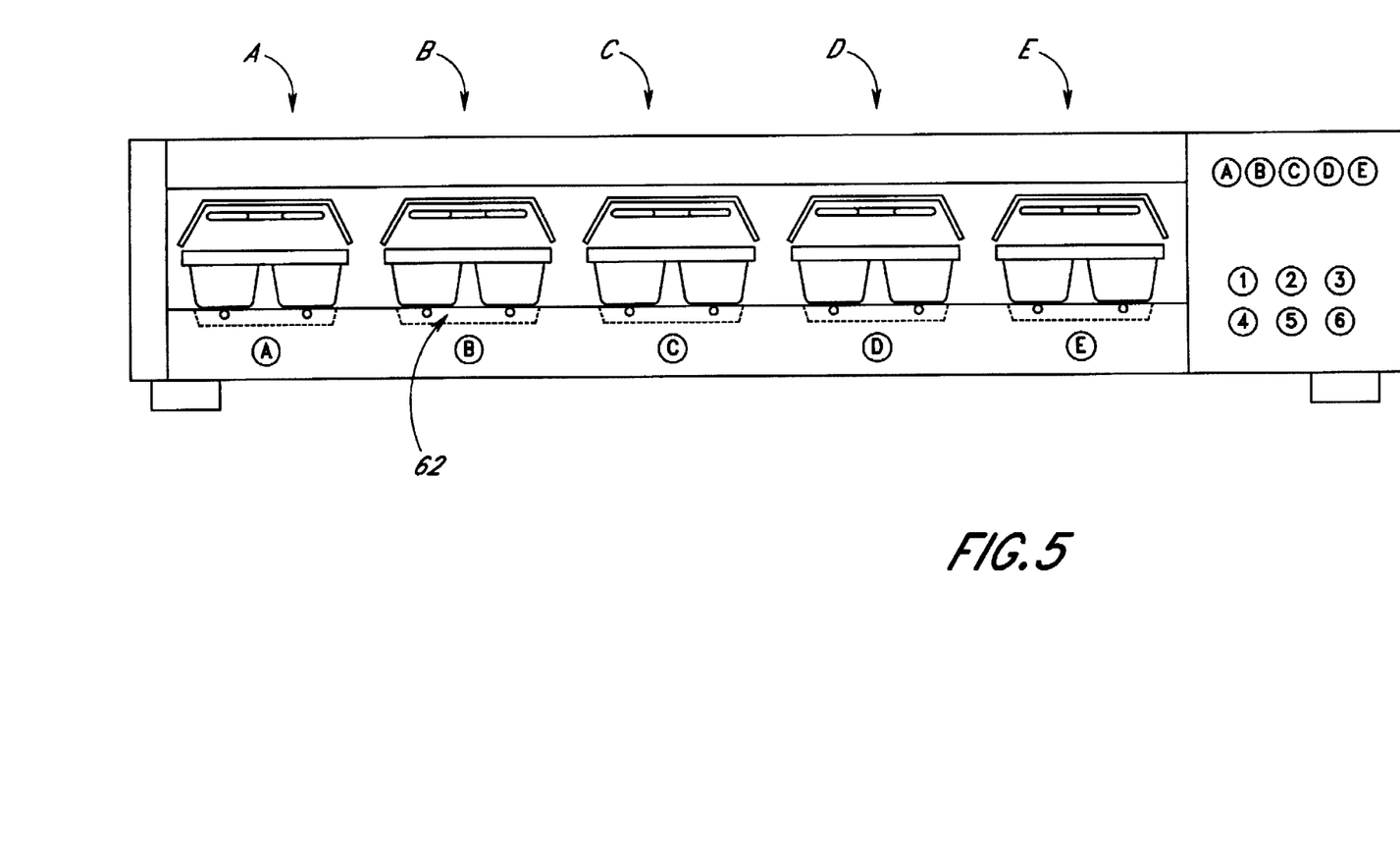
FIG. 5 is a front view of the cooker unit shown in FIG. 4.
Figure 6:
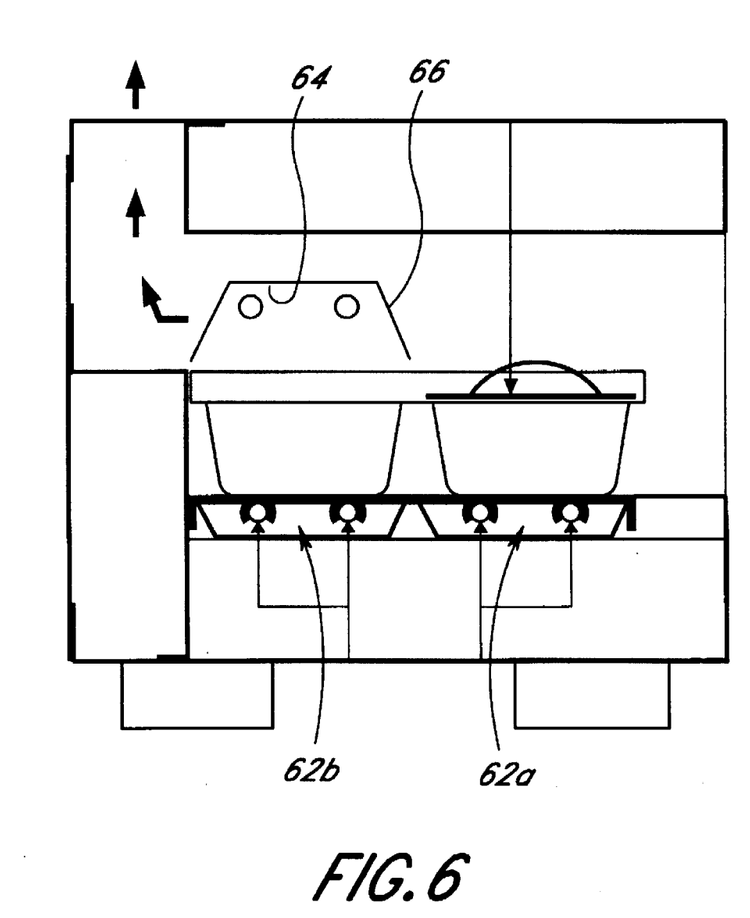
FIG. 6 is a schematic sectional side view of the cooker unit shown in FIG. 4.

A second embodiment of the invention as shown in FIGS. 4 to 6 relates to a cooker unit for producing several meals simultaneously. The cooker unit is open at the front and comprises several cooking stations. As shown there are five cooking stations (A-E) although the cooker unit may comprise a greater or lesser number of cooking stations. Each cooking station comprises a hotplate 62 divided into front and rear cooking zones 62a, 62b with separate heating elements for each zone, and an upper radiant grilling element 64 which extends over the rear cooking zone 62b of the hotplate 2. The radiant grilling element 64 is associated with a reflector 66 to direct radiant energy downwardly. In effect, each of the cooking stations A-E is equivalent to the single cooker unit described with reference to FIGS. 1 to 3. The hotplate 62 is provided with upstanding ribs along its opposite sides and rear end so as to locate a two-compartment food container (preferably a foil container) on the hotplate with one of the compartments located on the rear zone 62b of the hotplate 62 and beneath the radiant grilling element 64 and the other compartment on the front zone 62a of the hotplate 62. Each cooking station is program-controlled to provide a programmed cooking action corresponding to the food within the container in a similar manner to that disclosed with reference to FIGS. 1 to 3. In particular there is a set of program buttons 70 each programmed to provide a different cooking program, and a set of station selection buttons 72 whereby each cooking station can be programmed with any selected one of the program buttons 70. The program control may include a facility whereby after the particular program required for each individual station has been selected, the overall group of programs is actuated automatically at start times which will ensure that cooking at each of the stations is finished at the same time even although each cooking station may be operating to a different cooking program.

In a modification of this embodiment, instead of incorporating a set of program buttons 70 and station selection buttons 72, each cooking station may have its own set of program buttons whereby control components manufactured for use in the first embodiment as shown in FIG. 3 can be incorporated substantially without change in each of the several cooking stations.

Preferably the cooker unit is of modular construction whereby a number of units can be arranged side-by-side and in stacked relationship in order to increase the number of available cooking stations.

The cooker units of the first and second embodiments of this invention are designed for use with complete pre-prepared meals in different compartments of a single container. The embodiment shown in FIGS. 7 to 9 comprises several cooking stations but in this case each station is designed to cook a single food product within a container. As shown, there are eight stations (A-H), but the actual number may be different from that shown. Each cooking station has a lower hotplate 80 and an upper radiant grilling element 82 associated with a reflector 83 to direct radiant energy downwardly; as each station is designed to cook only a single food product, the hotplate 80 is not divided into different cooking zones and the radiant grilling element extends over the whole of the hotplate.

Figure 7:
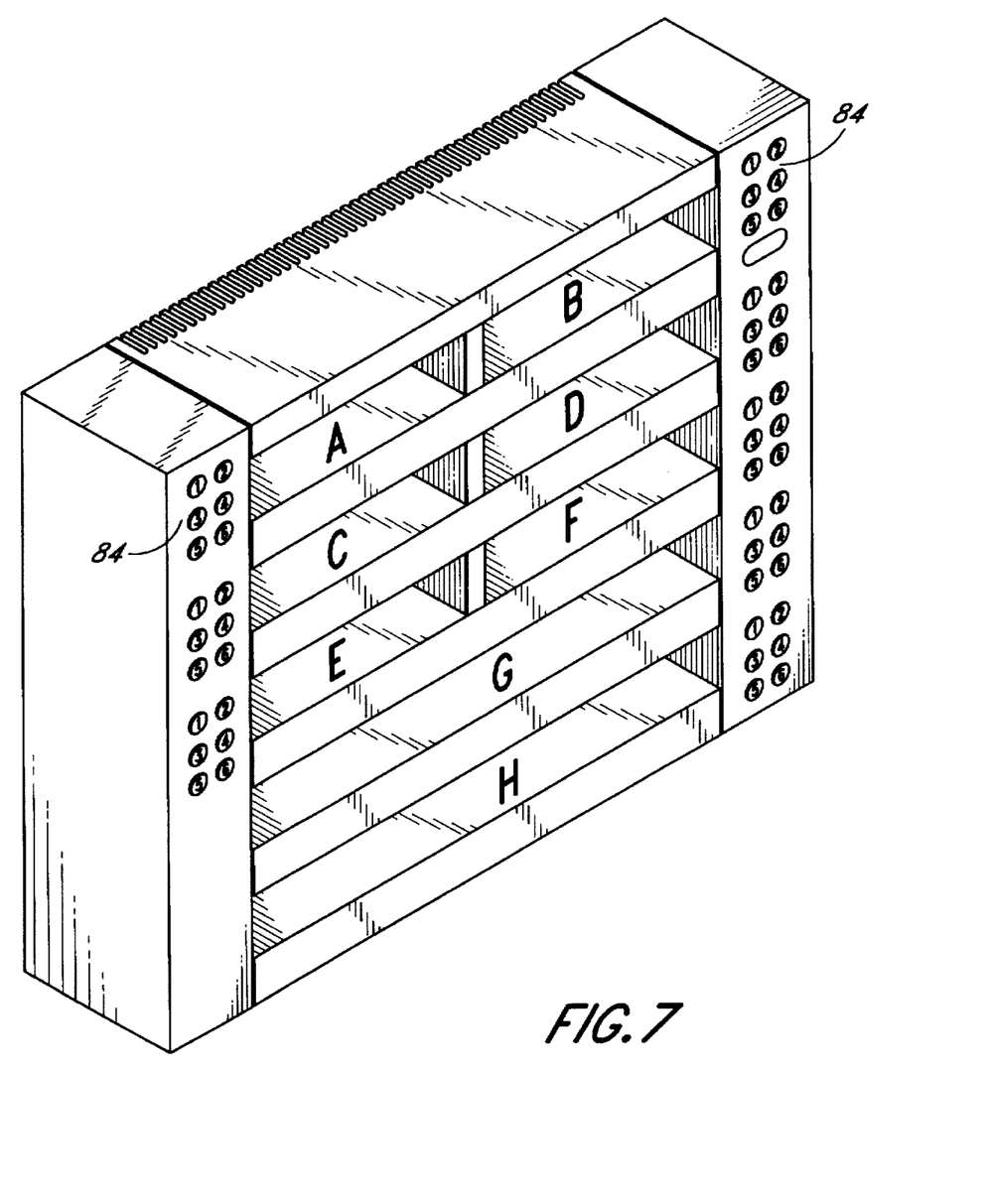
FIG. 7 is a perspective view of a cooker unit in accordance with a third embodiment of the invention.
Figure 8:
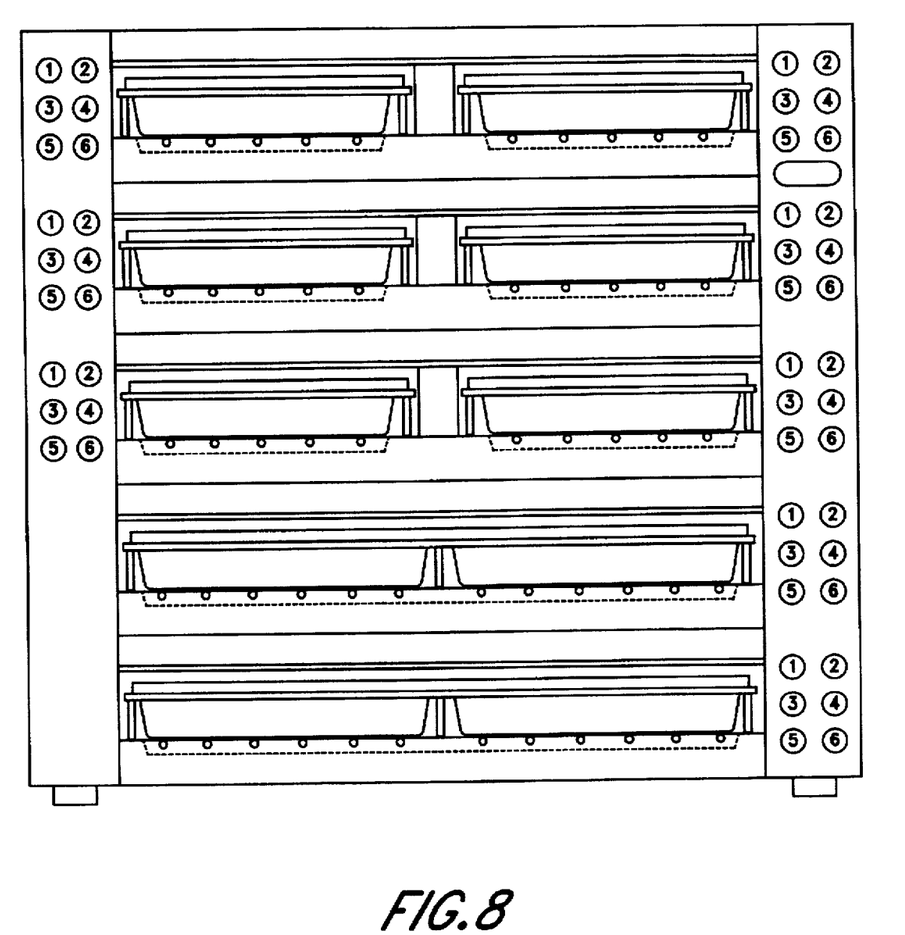
FIG. 8 is a front view of the cooker unit shown in FIG. 7.
Figure 9:
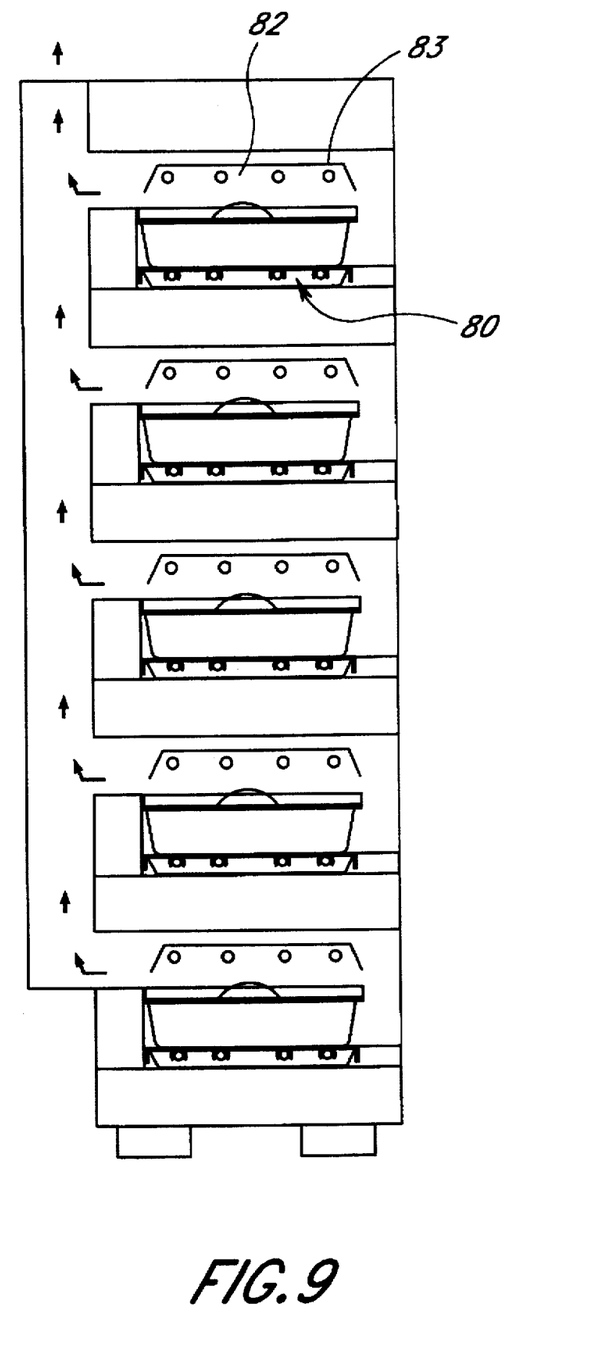
FIG. 9 is a schematic sectional side view of the cooker unit shown in FIGS. 7 and 8.

The cooking stations A-H are arranged in tiers. In some tiers there are two cooking stations whereas in other tiers there is a single cooking station which can handle larger size containers. In each cooking station cooking can be achieved either using the hotplate only, the radiant grilling element only, or a combination of the hotplate and radiant grilling element. The cooking program for each cooking station is selected from a number of predetermined cooking programs in a similar manner to that previously described and for this purpose the cooker unit comprises a series of program selection buttons 84 corresponding to each cooking station; alternatively, there may be a single set of program selection buttons and a series of station selection buttons. With a cooker unit such as this, different containers containing different meats, poultry, or fish and different vegetables are placed into the respective cooking stations, and the cooking program corresponding to the particular food product is selected and programmed into the appropriate station. In the unit illustrated where certain of the tiers only have a single cooking station (the stations G and H), these stations are particularly suitable for cooking large dishes of vegetables. The program control system may include a facility to automatically set the starting times of the different cooking stations so that all stations finish cooking at the same time.

In each of the embodiments described herein the food is prepared in advance, preferably in foil containers, and is refrigerated or frozen. Advantageously, each container is coded with a marking corresponding to the required cooking program so that the operator only has to select the program corresponding to that which is coded on the food container. Each of the cooking programs is pre-programmed into the cooker unit and the user is not required to perform basic programming actions, although if required the unit may include some facility for program adjustment. For most applications a complete range of foods can be cooked in this way with only about six different cooking programs.

The basic food product stored in the containers is uncooked with the result that the end product delivered from the cooker unit is freshly cooked rather than just reheated. The simplicity of cooking using pre-installed cooking programs which can be selected in accordance with the coding on the food container provides a prepared meals system which is suitable for a wide variety of applications, such as bars and small canteens.

The embodiments have been described by way of example only and modifications are possible within the scope of the invention.

We claim:

1. A prepared meals system comprising:
    a plurality of heat-conductive food containers each of said containers being substantially identical form and each comprising at least first and second food-containing compartments for containing different foods having differing cooking requirements in accordance with a different one of a plurality of predetermined cooking procedures; and
    a cooker unit for use with said food containers, said cooker unit comprising:
        at least one cooking station configured to removably receive one of said food containers, said cooking station comprising:
            a lower hotplate on which said one of said food containers rests, said hotplate having a plurality of heating zones, each of said heating zones lying beneath a respective one of said first and second food compartments of said one food container in use within said cooker unit, and each of said heating zones being individually actuable to facilitate differential conductive heating from below said first and second compartments of said one food container; and
            a radiant heating element positioned above said hotplate, said radiant heating element being positioned to lie above one of said first and second compartments of said one of said food containers in use within said cooker unit whereby to grill from above the food in said one compartment without grilling the food in the other of said first and second compartments;

a controller capable of operating said heating zones and radiant heating element in accordance with a selected one of a plurality of predetermined programs which provide different heating and cooking actions for the food within the respective compartments; and a program selector operable by a user to select the program required for the particular food container in use within said cooking station.

2. A prepared meals system according to claim 1, wherein the cooker unit has a single said cooking station whereby the cooker unit can only accept a single said food container at a time.

3. A prepared meals system according to claim 1, wherein the hotplate is of rectangular shape and comprises ribs along opposed lateral edges and a rear edge of the hotplate, whereby the container may be slid onto the hotplate from the front into a predetermined location on the hotplate.

4. A prepared meals system according to claim 1, wherein the program selector operable by the user has discrete indicia for each respective program, and each of said food containers has indicia corresponding to that of the required program of the program selector.

5. A prepared meals system according to claim 1, wherein the cooker unit has a plurality of said cooking stations, whereby the unit can accept a corresponding plurality of said food containers at a time, the controller being such that each cooking station can be separately controlled in accordance with a selected one of the predetermined programs.

6. A prepared meals system according to claim 5, wherein the controller operates the respective cooking stations such that cooking finishes at substantially the same time in each of the cooking stations in use.

\* \* \* \* \*